Jan. 4, 1927.

W. L. CHAMBERLAIN

INCUBATOR

Filed Oct. 29, 1925    2 Sheets-Sheet 1

1,613,342

Inventor
Wilbur L. Chamberlain
By Attorney H. G. Manning

Jan. 4, 1927. 1,613,342
W. L. CHAMBERLAIN
INCUBATOR
Filed Oct. 29, 1925 2 Sheets-Sheet 2

Inventor
Wilbur L. Chamberlain
Attorney H. S. Manning

Patented Jan. 4, 1927.

1,613,342

UNITED STATES PATENT OFFICE.

WILBUR L. CHAMBERLAIN, OF MERIDEN, CONNECTICUT.

INCUBATOR.

Application filed October 29, 1925. Serial No. 65,615.

This invention relates to incubators, and more particularly to an incubator in which the eggs are heated by direct contact with a flexible heating surface located above the tray containing the eggs.

One object of the invention is to provide an improved device for supplying heat to the eggs comprising a water tank having a flexible bottom surface.

A further object is to provide a device of the above nature which will be simple in construction, inexpensive to manufacture, easy to manipulate, compact, and very efficient and durable in use.

With these and other objects in view there has been illustrated on the accompanying drawings one form in which the invention may be conveniently embodied in practice.

Figure 1:
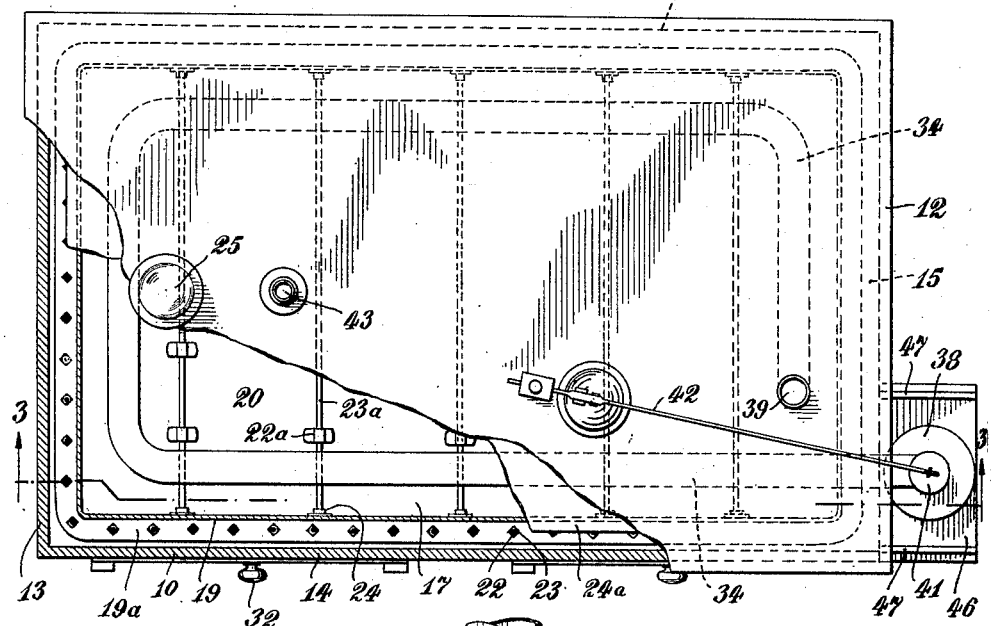
Fig. 1 represents a top plan view of the incubator shown partly in section.

Referring now to the drawings in which like reference numerals denote corresponding parts throughout the several views, the numeral 10 indicates the outer casing of the incubator, said casing having a bottom wall 11, a top wall 12, and side walls 13, 14, 15, and 16. In order to supply heat to the eggs being hatched provision is made of a water tank 17 suitably supported within the casing 10, as by a molding 18. The tank 17 has side and end walls 19 preferably of metal and said walls are provided with an outwardly extending bottom flange $19^a$ adapted to rest upon a thin flexible sheet 20, preferably of rubber, forming the bottom of the water tank. The rubber sheet 20 in turn rests upon a rectangular strip 21 and said flange $19^a$, sheet 20, and strip 21 are connected together by a plurality of bolts and nuts 22 and 23 forming a water tight joint.

The intermediate portion of the rubber sheet 20 is supported by a plurality of resilient hanger members $22^a$, preferably of rubber, said hanger members having their bases attached, as by cement, to the sheet 20. The upper ends of said hanger members 22 are looped over a series of rods $23^a$, five in number in this instance, said rods having their ends seated in socket members 24 located on the side walls of the metal tank 17. By means of this construction, the rubber bottom of the tank will be permitted to yield upwardly at the points of contact with the eggs beneath.

The top of the tank is closed by a cover member $24^a$ through which projects an inverted reservoir 25 containing a reserve supply of water for automatically maintaining a constant level of water in the tank.

In order to support the eggs to be hatched, a tray 26 is provided in the lower part of the casing, said tray being guided on runways 27 at both sides of the casing. The tray 26 comprises a rectangular frame having a series of parallel supporting slats 28 upon which is a heavy wire netting for receiving a plurality of eggs $28^a$.

In order to permit convenient access to the lower part of the casing for inserting and removing eggs, provision is made of a door 29 hinged at 30 in the side wall 14 of said casing. The door 29 is provided with a locking device 31 adapted to be manipulated by a handle 32.

Figure 2:
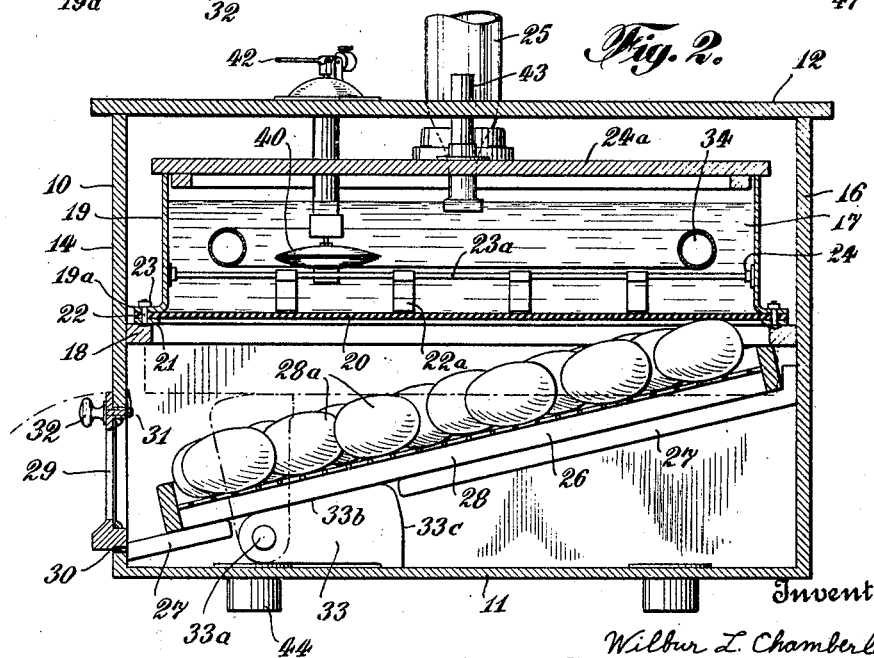
Fig. 2 is a transverse sectional view of the same, taken along the line 2—2 of Fig. 3, looking in the direction of the arrows.
Figure 3:
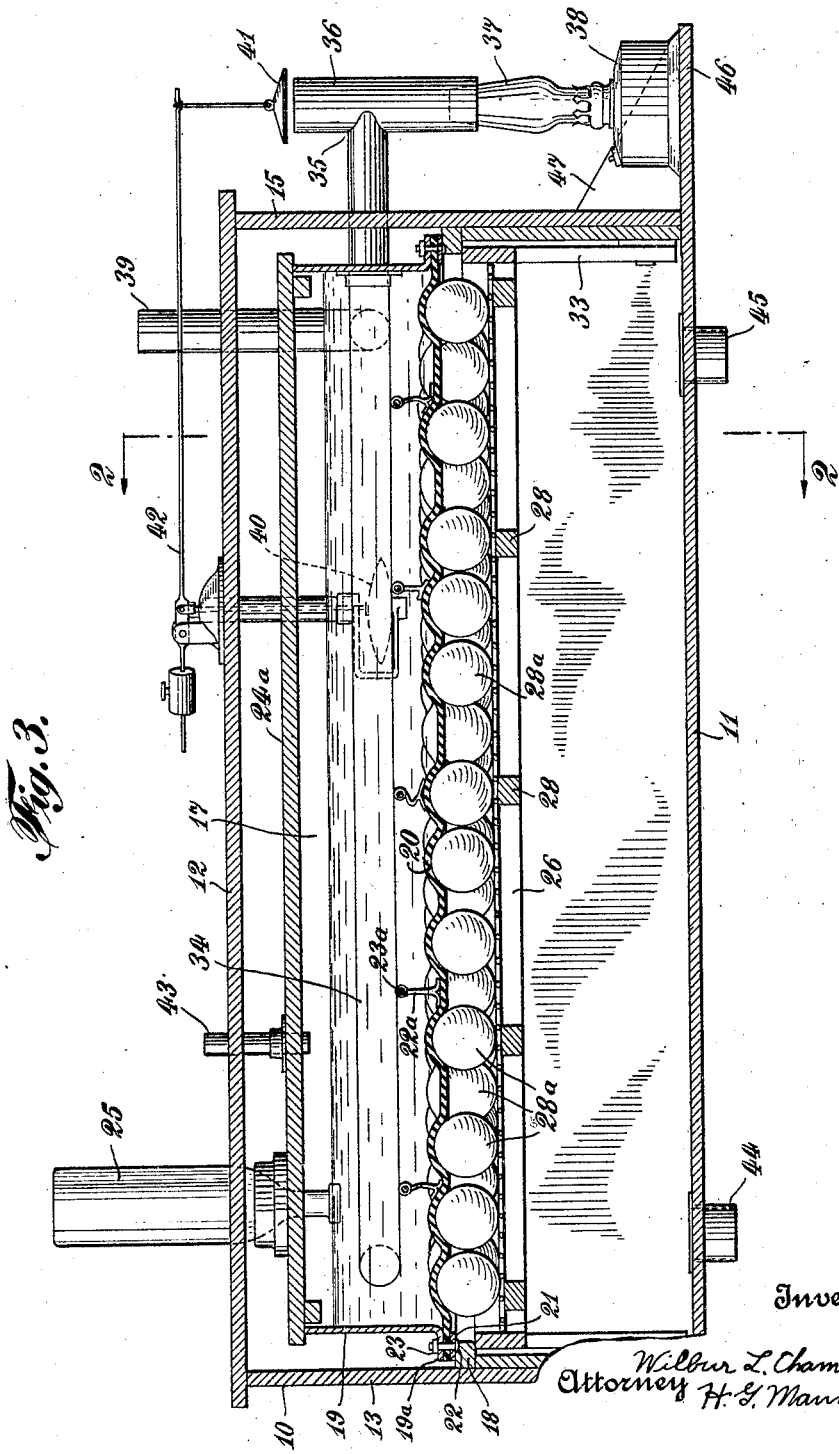
Fig. 3 is a longitudinal sectional view taken along the line 3—3 of Fig. 1, looking in the direction of the arrows.

In order to support the tray of eggs either in or out of incubating position, a supporting member 33 is provided underneath the end of the tray adjacent the door 29. The supporting member 33 is pivoted at $33^a$ to the bottom wall 11 and has its edges $33^b$ and $33^c$ disposed at an angle to each other. When the tray is lowered, as shown in full lines in Fig. 2, it rests upon the edge $33^b$ of the supporting member 33. When it is desired to lock the tray in incubating position, the operator will insert his hand through the door opening, raise the tray, and swing the supporting member 33 from the full line to the dotted line position shown in Fig. 2 at which time the tray will rest upon the edge $33^c$ of the supporting member.

In operation, the top surfaces of the eggs will be in direct overhead contact with the rubber sheet 20 and will be continously heated thereby. The lower portions of the eggs which are in contact with the air of the lower casing will be maintained at a slightly lower temperature than the upper portion. It will thus be seen that there will be a continuous flow of heat from the top to the bottom of each egg, and it has been found by the inventor that this condition is conducive to producing the maximum percentage hatch of the fertile eggs.

The water in the tank 18 is heated by a loop-shaped pipe 34, said pipe extending horizontally out of said tank and being connected as at 35 to a vertical tubular member 36 surrounding the upper end of the chimney 37 of the lamp 38. The other end of said pipe 34 is provided with a discharge stack 39 extending vertically upward through the casing 10 for some distance in order to provide a suitable draft to draw the products of combustion from the lamp 38 through the pipe 34. The temperature of the water in the tank 18 is controlled by a "wafer" thermostat 40 located under the surface of the water and operating a damper 41 located above the top of the tubular member 36. For this purpose any suitable standard lever mechanism 42 may be employed.

A relief pipe 43 is provided at the top of the casing 10 and passes down through the cover of the tank 24, said relief pipe serving to equalize the pressure between the inside of the tank and the outside atmosphere. In order to provide ventilation for the chamber below the eggs, a pair of short pipes 44 and 45 are provided in the bottom 11 of the casing.

The lamp 38 is supported on a shelf 46 comprising an extension of the bottom wall 11, and said shelf is reinforced by a pair of inclined brackets 47 at either side of said lamp.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention what is claimed as new and for which it is desired to secure Letters Patent is:

In an incubator, a flexible-bottomed tank for containing means for heating the eggs to be incubated, a pivoted tray for supporting a plurality of eggs in direct contact with the flexible bottom of said tank, and a member pivoted to the bottom of said incubator, said member having a relatively long inclined face for supporting the free end of the tray when out of operating position and a relatively short curved face for supporting the free end of the tray when in incubating position.

In testimony whereof, I have affixed my signature to this specification.

WILBUR L. CHAMBERLAIN.